(12) United States Patent
Anbe

(10) Patent No.: US 6,192,030 B1
(45) Date of Patent: Feb. 20, 2001

(54) PHS SUBSCRIBER LOOP MULTIPLEX COMMUNICATION SYSTEM

(75) Inventor: Yoshimi Anbe, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/073,954

(22) Filed: May 7, 1998

(30) Foreign Application Priority Data

May 7, 1997 (JP) .................................................. 9-116653

(51) Int. Cl.[7] ........................... G01R 31/08; G06F 11/00; G08C 15/00; H04Q 9/00
(52) U.S. Cl. ........................... 370/229; 370/328; 370/375; 370/524; 370/538
(58) Field of Search .................................... 370/229–235, 370/328, 375, 324, 538, 522, 537; 455/524, 515, 509, 517, 507, 14

(56) References Cited

U.S. PATENT DOCUMENTS 5,283,788 * 2/1994 Morita et al. ...................... 370/110.1
5,761,274 * 6/1998 Uehara et al. .......................... 379/88
5,835,484 * 11/1998 Yamato et al. ...................... 370/230
6,047,176 * 4/2000 Sakamoto et al. ................... 455/422

* cited by examiner

Primary Examiner—Alpus H. Hsu
Assistant Examiner—Duc Ho
(74) Attorney, Agent, or Firm—Foley & Lardner

(57) ABSTRACT

In a communication system between a CS concentrator 50-1 concentrating lines of PHS radio base stations 10-1 to 10-N and being located in a remote area and a subscriber terminal device 60 in a PHS exchange, by multiplexing two call control groups of (14B+D+C) channels on a 2M primary-group transmission line, a PHS system is constructed which uses the 2M primary-group transmission line with a good channel operating efficiency.

3 Claims, 15 Drawing Sheets

| TS | 0 | 1 | 2 | 3 | 4 | 5 | 6 | 7 | 8 | 9 | 10 | 11 | 12 | 13 | 14 | 15 |
|----|---|---|---|---|---|---|---|---|---|---|----|----|----|----|----|----|
| | ** | D+C | B1 | B2 | B3 | B4 | B5 | B6 | B7 | B8 | B9 | B10 | B11 | B12 | B13 | B14 |

| | 16 | 17 | 18 | 19 | 20 | 21 | 22 | 23 | 24 | 25 | 26 | 27 | 28 | 29 | 30 | 31 |
|----|----|----|----|----|----|----|----|----|----|----|----|----|----|----|----|----|
| | * | D+C | B1 | B2 | B3 | B4 | B5 | B6 | B7 | B8 | B9 | B10 | B11 | B12 | B13 | B14 |

\* : UNUSED
\*\* : FRAME SYNCHRONIZING TIME SLOT

|  | C0 | C1 |
|---|---|---|
| NO REGULATION | 1 | 1 |
| 25% REGULATION | 1 | 0 |
| 50% REGULATION | 0 | 1 |
| 100% REGULATION | 0 | 0 |

FIG. 6

| TS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | D | D | D | D | D | D | D | D | D | D | D | D | D | D | D | D |
| | CS0 | CS1 | CS2 | CS3 | CS4 | CS5 | CS6 | CS7 | CS8 | CS9 | CS10 | CS11 | CS12 | CS13 | CS14 | CS15 |

| 16 | 17 | 18 | 19 | 20 | 21 | 22 | 23 | 24 | 25 | 26 | 27 | 28 | 29 | 30 | 31 | 0 |
|---|---|---|---|---|---|---|---|---|---|---|---|---|---|---|---|---|
| D | D | D | D | D | D | D | D | D | D | D | D | D | D | D | D | |
| CS16 | CS17 | CS18 | CS19 | CS20 | CS21 | CS22 | CS23 | CS24 | CS25 | CS26 | CS27 | CS28 | CS29 | CS30 | CS31 | |

FIG. 11

PHS SUBSCRIBER LOOP MULTIPLEX COMMUNICATION SYSTEM

BACKGROUND OF THE INVENTION

The present invention relates to a communication system between at least one CS concentrator connected to at least one PHS radio base station (hereinafter referred to as CS) and located in a remote area and a subscriber terminal device in a PHS exchange.

In a conventional PHS system, connection is made by a 1.5M primary-group transmission line between a CS concentrator containing a plurality of CSs and having a line concentrating function and a subscriber terminal device in a PHS exchange. The 1.5M primary-group transmission line is, as disclosed in Bellcore TR-TSY-000303, a system for time division multiplexing of (2B+D) channels of an ISDN basic interface (hereinafter referred to as BRI) on time slots and for multiplexing a maintenance channel C in a channel D time slot.

Also, as disclosed in TTC JT-Q931-b, it is well known that there is a mode having an interface structure for a shared channel D. In this case, a certain BRI channel is used as a control channel of a channel B in another BRI. The mode has the interface structure of (16B+D) which uses eight BRIs.

Further, as a traffic control method of the conventional PHS exchange, the following procedure is known. In the procedure, in response to a calling/position registration message which is generated beyond a processing capability and defined by TTC JT-Q931-b, a disconnection message is returned from the exchange back to the CS concentrator.

The aforementioned 1.5M primary-group transmission line is not an economical loop operation method. This is because in the system using the conventional 1.5M primary-group transmission line, the call control of sixteen channels B in eight BRIs is performed by a channel D of a single BRI and seven channels D are therefore unused.

Also, in the conventional traffic control method, in response to the calling/position registration message, the disconnection message is returned from the exchange back to the CS concentrator. In this case, when the number of CS concentrators is increased, there is a possibility that not only a new calling/position registration but also a call in the midst of a call setting procedure are disconnected by time out of a timer (T310) of layer 3 because of a delay between the CS concentrators and the exchange and a delay inside the exchange. Specifically, in the conventional traffic control method, when the number of CS concentrators is increased and the call information beyond the processing capability is received, then the information is placed in a queue for processing. Therefore, the more the quantity of call information is, the longer the waiting time in the queue is.

SUMMARY OF THE INVENTION

Therefore, an object of the present invention is to provide a PHS subscriber loop multiplex communication system in which by multiplexing two (14B+D) channel call control groups in a 2M primary-group transmission line, a line operation efficiency is enhanced.

Another object of the present invention is to provide a simple PHS subscriber loop multiplex communication system which obviates the necessity of changing a (16B+D) interface structure in conformity to TTC JT-Q931-b as a layer 3 function of a CS concentrator using a conventional 1.5M primary-group transmission line and a subscriber terminal device.

Still another object of the present invention is to provide a PHS subscriber loop multiplex communication system in which even when an excess load is applied, a predetermined processing capability can be realized through a traffic control using a maintenance control information channel (channel C) which is different from a call control information channel (channel D) and multiplexed in the same time slot as that of the channel D.

To attain this and other objects, the present invention provides a PHS subscriber loop multiplex communication system in which connection is made by a 2M primary-group transmission line between a PHS radio base station concentrator connected to a PHS radio base station and located in a remote area and a subscriber terminal device in a PHS exchange, and two (14B+D+C) channel call control groups are multiplexed on the 2M primary-group transmission line.

According to an aspect of the present invention, a PHS radio base station concentrator includes a first interface section for interfacing with a subscriber terminal device via a 2M primary-group transmission line in which two (14B+D+C) channel call control groups are multiplexed on a single transmission line; a first (D+C) channel terminal section for terminating a channel D for performing communication with the subscriber terminal device by using TTC JT-Q921-b and a channel C for receiving maintenance control information from the subscriber terminal device; and a first time division multiplex switch section for using a time division switch to connect (D+C) channel information of the first (D+C) channel terminal section to a (D+C) channel interfacing on the 2M primary-group transmission line. The subscriber terminal device includes a second interface section for interfacing with a PHS radio base station terminal device via the 2M primary-group transmission line in which two (14B+D+C) channel call control groups are multiplexed on a single transmission line; a second (D+C) channel terminal section for terminating the channel D for performing communication with a PHS radio base station by using TTC JT-Q921-b and the channel C for transmitting the maintenance control information to the PHS radio base station; and a second time division multiplex switch section for using a time division switch to connect (D+C) channel information of the second (D+C) channel terminal section to the (D+C) channel interfacing on the 2M primary-group transmission line. In the 2M primary-group transmission line, two groups of (14B+D+C) channels are placed.

BRIEF DESCRIPTION OF THE DRAWINGS

FIG. 4 is an explanatory view showing a time slot allocation between a CS concentrator and a subscriber terminal device shown in FIG. 3;

FIG. 5 is an explanatory view showing a time slot allocation between a (D+C) channel terminal section and a time division multiplex switch section in the CS concentrator shown in FIG. 3;

FIG. 6 is a chart showing examples of transmission regulating values which are applied to the present invention;

FIG. 11 is an explanatory view showing a time slot allocation between an L2 terminal section and a time division multiplex switch in the CS concentrator shown in FIG. 7;

DESCRIPTION OF PREFERRED EMBODIMENTS

Figure 1:
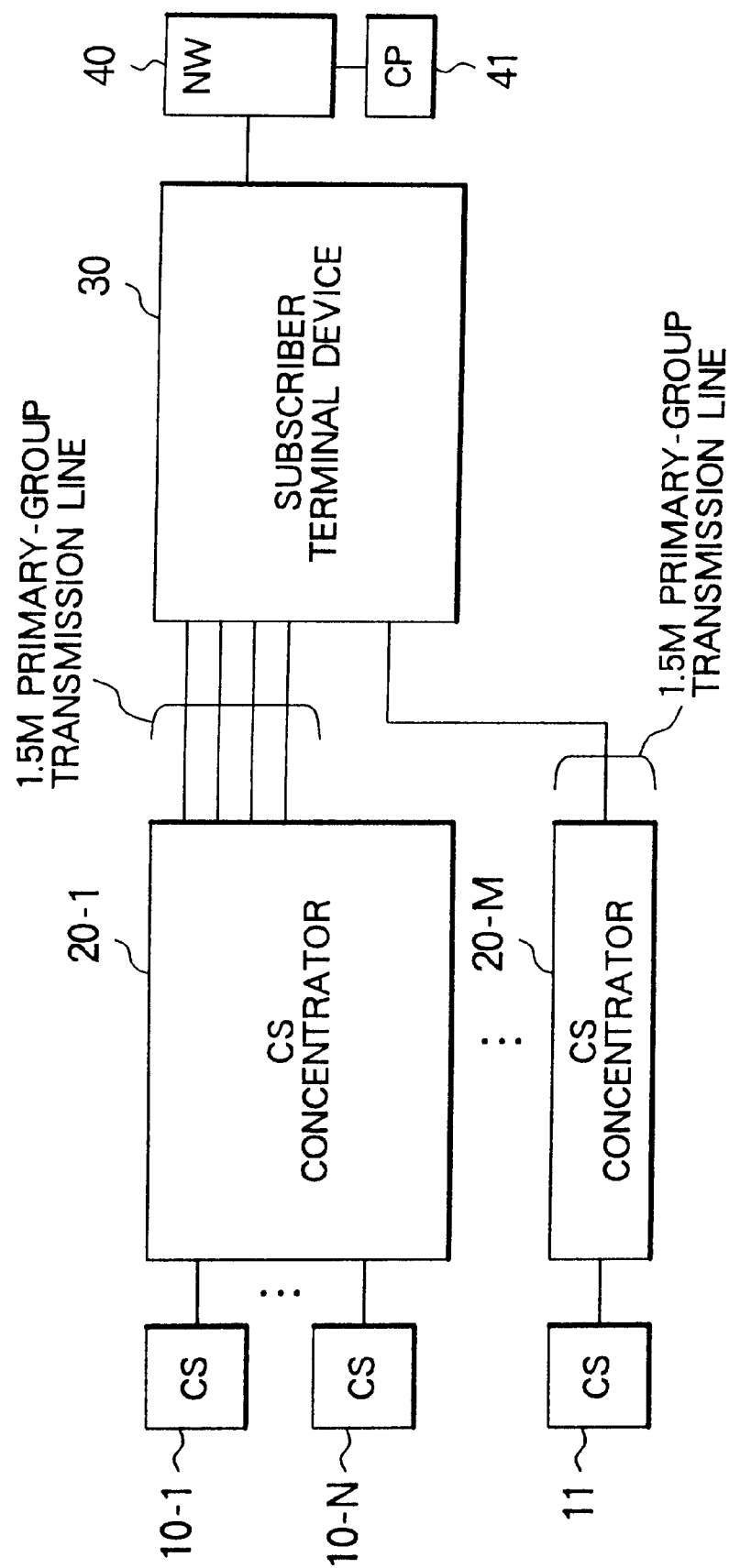
FIG. 1 is an explanatory view showing a construction of a conventional PHS subscriber loop multiplex communication system.
Figure 2:
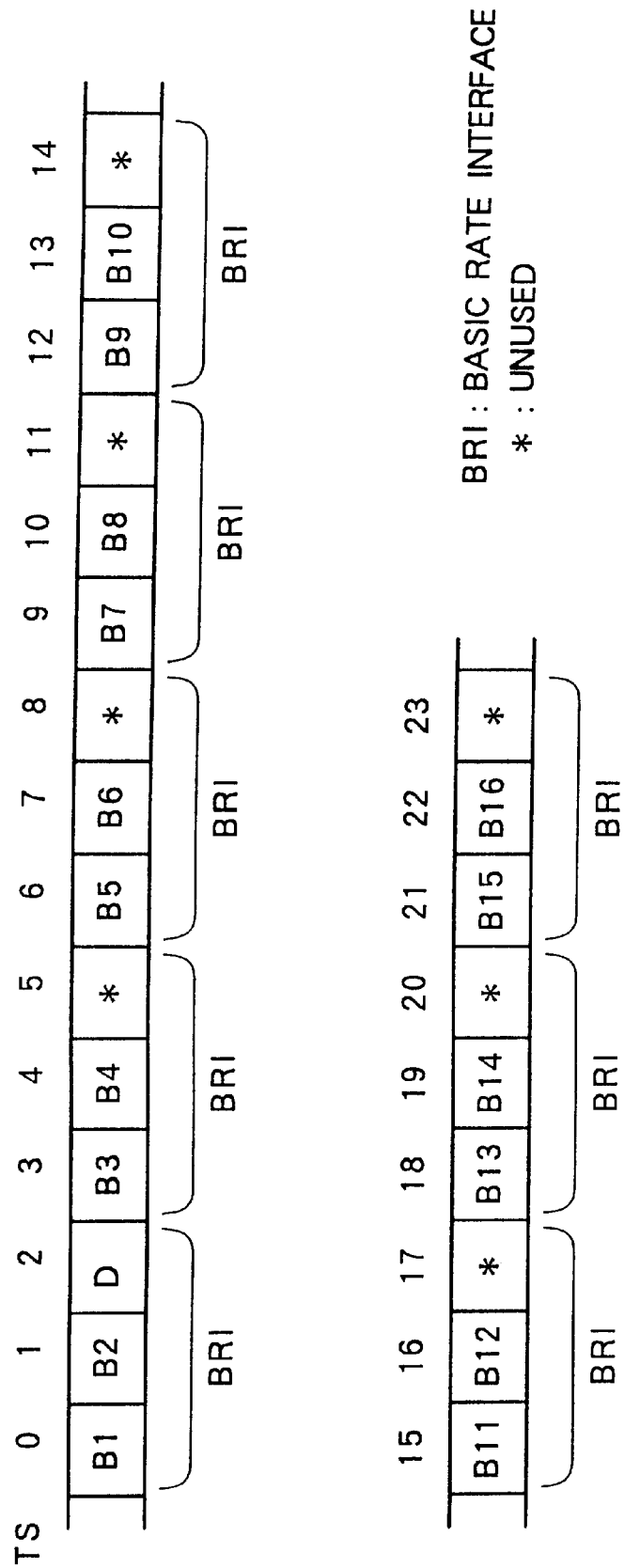
FIG. 2 is an explanatory view showing a time slot allocation between a CS concentrator and a subscriber terminal device shown in FIG. 1.

A conventional PHS system will be described with reference to FIG. 1 and 2. In FIG. 1, the PHS system includes a CS concentrator 20-1 containing a plurality of CSs 10-1 to 10-N and having a line concentrating function, a CS concentrator 20-M containing a CS 11, a subscriber terminal device 30 in a PHS exchange, a network (hereinafter referred to as NW) 40 and a call processor (hereinafter referred to as CP) 41. Connection is made via a 1.5M primary-group transmission line between the plurality of CS concentrators 20-1 to 20-M and the subscriber terminal device 30. The 1.5M primary-group transmission line is disclosed in Bellcore TR-TSY-000303. In the 1.5M primary-group transmission line, on time slots TS, (2B+D) channels of an ISDN basic interface (hereinafter referred to as BRI) are time-division multiplexed as shown in FIG. 2. Additionally, a maintenance channel C is multiplexed in a channel D time slot.

Additionally, as disclosed in TTC JT-Q931-b,it is well known that there is a mode having an interface structure for a shared channel D in which a certain BRI channel is used as a control channel of a channel B of another BRI. The mode has the (16B+D) interface structure using eight BRIs.

Further, as a traffic control method of the conventional PHS exchange, the following procedure is known. In the procedure, in response to a calling/position registration message which is generated beyond the processing capability and defined by TTC JT-Q931-b, a disconnection message is returned from the exchange back to the CS concentrator.

The aforementioned 1.5M primary-group transmission line is not an economical loop operation method. This is because in the system using the conventional 1.5M primary-group transmission line, the call control of sixteen channels B in eight BRIs is performed by a channel D of a single BRI and seven channels D are therefore unused.

Also, in the conventional traffic control method, in response to the calling/position registration message, the disconnection message is returned from the exchange back to the CS concentrator. In this case, when the number of CS concentrators is increased, there is a possibility that not only a new calling/position registration but also a call in the midst of a call setting procedure are disconnected by time out of a layer 3 timer (T310) because of a delay between the CS concentrators and the exchange and a delay inside the exchange. Specifically, in the conventional traffic control method, when the number of CS concentrators is increased and call information beyond the processing capability is received, then the information is placed in a queue for processing. Therefore, the more the quantity of call information is, the longer the waiting time in the queue is.

Figure 3:
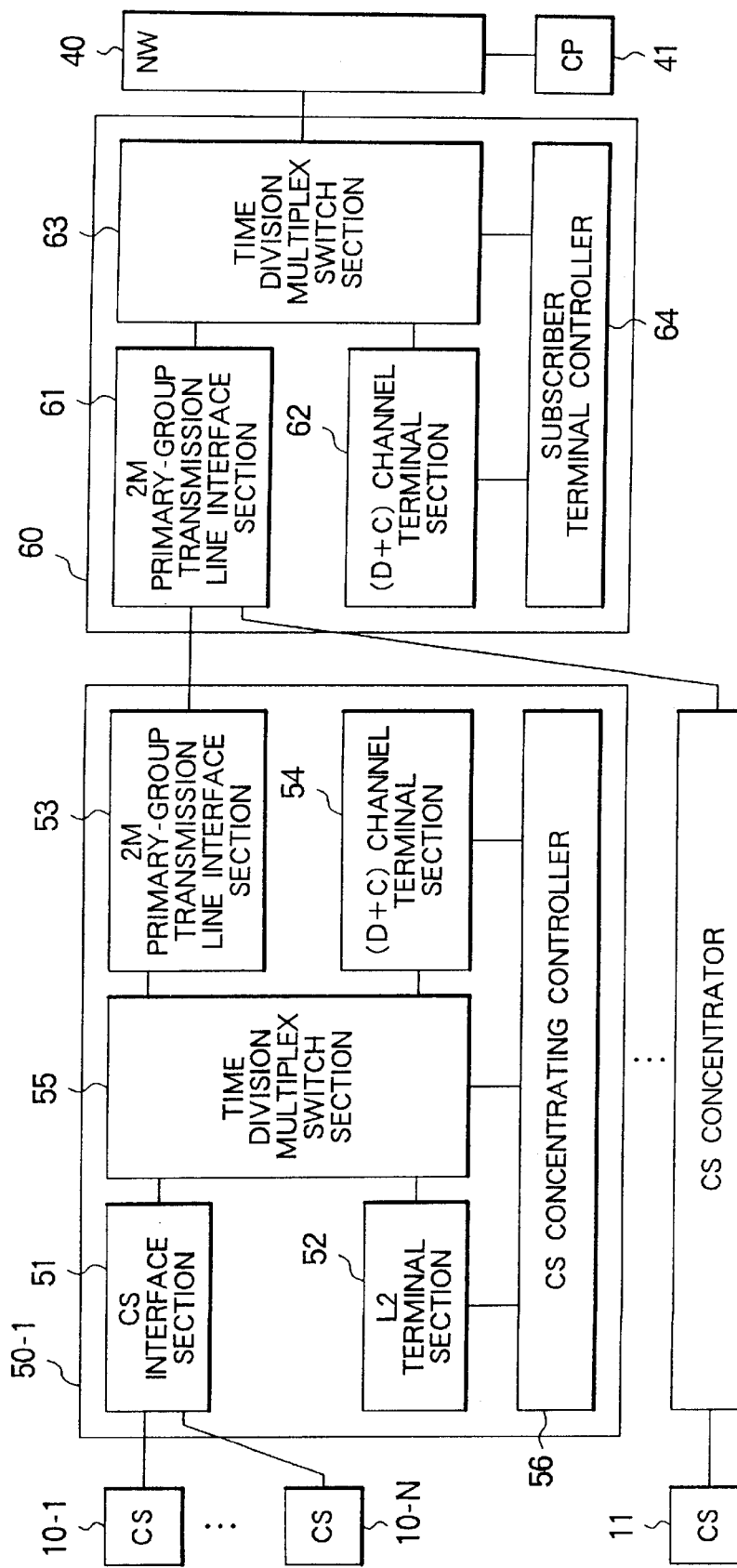
FIG. 3 is an explanatory view showing a basic construction of a PHS subscriber loop multiplex communication system according to the present invention.

A basic construction of a PHS subscriber loop multiplex communication system according to the present invention will be described with reference to FIGS. 3 and 4. In FIG. 3, the same elements as those in FIG. 1 are denoted with the same reference numerals. The system includes a CS concentrator 50-1 containing a plurality of CSs 10-1 to 10-N and having a line concentrating function, a CS concentrator 50-M containing a CS 11 and a subscriber terminal device 60 in a PHS exchange. Connection is made via a 2M primary-group transmission line between the plurality of CS concentrators 50-1 to 50-M and the subscriber terminal device 60. Additionally, in FIG. 3, only three of the plurality of CSs are shown. Similarly, only two of the plurality of CS concentrators are shown. The construction of the CS concentrator 50-M is the same as that of the CS concentrator 50-1 described in the following.

The CS concentrator 50-1 containing the CSs 10-1 to 10-N and located in a remote area includes a CS interface section 51 for terminating an interface U defined by ANSI T1. 601. An L2 terminal section 52 terminates a TTC JT-Q921-b layer 2 protocol. As shown in FIG. 4, a first 2M primary-group transmission line interface section 53 has an interface function with the 2M primary-group transmission line on which two groups of (14B+D+C) channels are multiplexed. A first (D+C) channel terminal section 54 terminates (D+C) channels shown in FIG. 4, performs communication with the subscriber terminal device 60 via the TTC JT-Q921-b layer 2 protocol and further receives transmission regulating information from the subscriber terminal device 60.

Under the control of a CS concentrating controller 56, a first time division multiplex switch section 55 connects channels D of the CS interface section 51 and the L2 terminal section 52, connects (D+C) channels of the first 2M primary-group transmission line interface section 53 and the first (D+C) channel terminal section 54, and connects the CS interface section 51 and channels B of the first 2M primary-group transmission line interface section 53 at the time of setting calls. The CS concentrating controller 56 is connected to the L2 terminal section 52, the first time division multiplex switch section 55 and the first (D+C) channel terminal section 54 to perform a TTC JT-Q931-b protocol control, a PHS call concentrating control and a transmission regulation control.

The subscriber terminal device 60 will be described. The subscriber terminal device 60 includes a second 2M primary-group transmission line interface section 61 which interfaces with the CS concentrators 50-1 to 50-M via the 2M primary-group transmission line in which two groups of (14B+D+C) channels are multiplexed as shown in FIG. 4. A second (D+C) channel terminal section 62 communicates with the CS concentrators 50-1 to 50-M with the TTC JT-Q921-b layer 2 protocol and additionally transmits transmission regulating information to the CS concentrators 50-1 to 50-M by the control of a subscriber terminal controller 64.

Under the control of the subscriber terminal controller 64, a second time division multiplex switch section 63 connects the second 2M primary-group transmission line interface section 61 and the (D+C) channel of the second (D+C) channel terminal section 62 and connects the second 2M primary-group transmission line interface section 61 and the channel B of the NW 40. The subscriber terminal controller 64 has a function of transmitting TTC JT-Q931-b layer 3 information. Also, the subscriber terminal controller 64 has a control function to monitor a traffic quantity of the layer 3 information and instructs the CS concentrators 50-1 to 50-M to transmit the transmission regulating information when the traffic quantity exceeds a predetermined threshold value.

Operation of the system will be described in detail. By the control of the CS concentrating controller 56, the first time division multiplex switch section 55 connects the channels D of the individual CSs of the CS interface section 51 and a layer 2 protocol connection channel of the L2 terminal section 52. Further, a (D+C) channel time slot placed as shown in FIG. 4 from the first 2M primary-group transmission line interface section 53 is connected to a (D+C) channel time slot from the first (D+C) channel terminal section 54.

Figure 5:
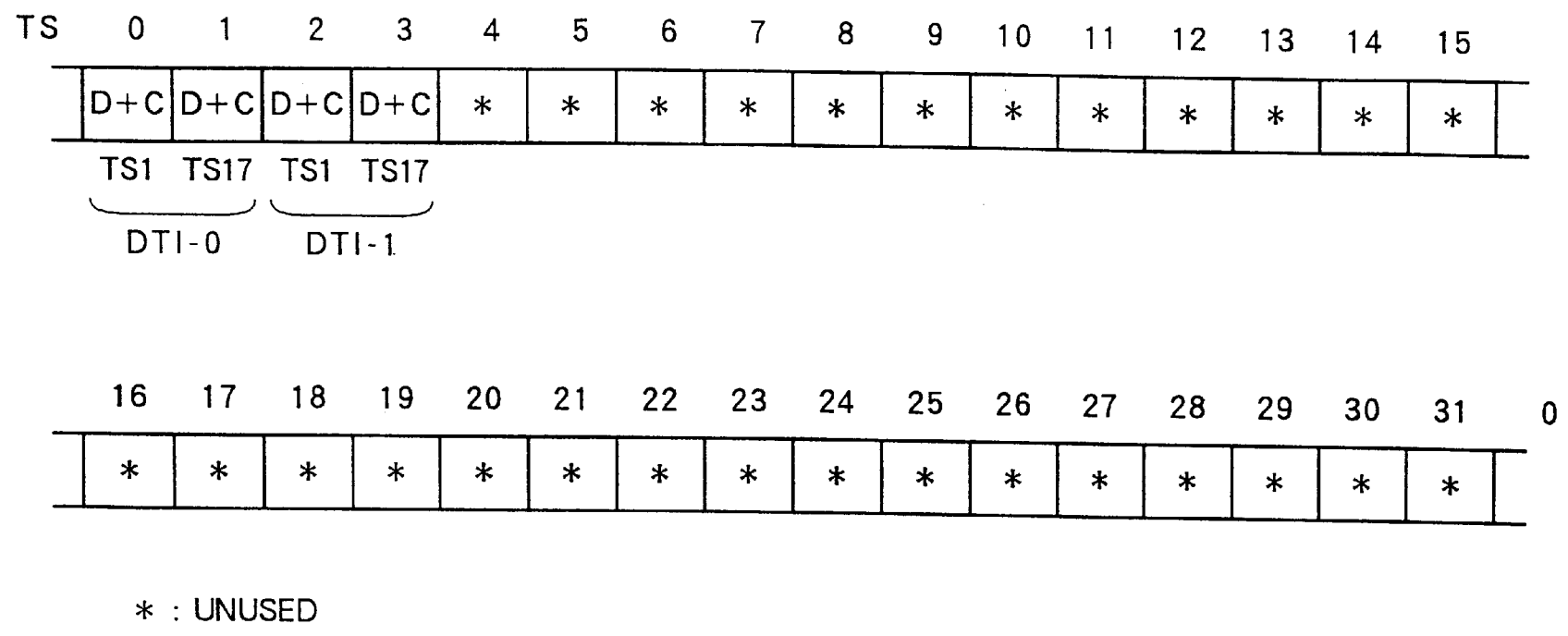

The operation will be described in further detail with reference to FIG. 5. A time slot TS1 of the 2M primary-group transmission line interface is connected to a time slot TS0 of FIG. 5. Then, a time slot TS17 is connected to a time slot TS1 of FIG. 5. When a plurality of first 2M primary-group transmission line interfaces 53 are packaged, a time slot TS2 and subsequent time slots of FIG. 5 can be used. Also, when two or more time slots of (D+C) channels are necessary in the 2M primary-group transmission line interface, simply the allocation of time slots may be changed by the first time division multiplex switch section 55.

By the control of the subscriber terminal controller 64, the second time division multiplex switch section 63 in the subscriber terminal device 60 connects the (D+C) channel time slot placed as shown in FIG. 4 from the second 2M primary-group transmission line interface section 61 and the (D+C) channel time slot from the second (D+C) channel terminal section 62.

The CS concentrating controller 56 selects a group with a vacancy in channel B when receiving a calling information from a certain CS, and transmits the calling information with the designated number of the vacant channel B to the subscriber terminal device 60 via the first (D+C) channel terminal section 54 for terminating the channel D of the selected group. Additionally, the CS concentrating controller 56 controls the first time division multiplex switch section 55 to connect a channel B time slot of the CS interface section 51 designated by the calling CS and a vacant channel B time slot of the first primary-group transmission line interface section 53. Additionally, when the call is disconnected, the connection of the first time division multiplex switch section 55 at the time of setting calls is released.

Subsequently, the subscriber terminal controller 64 calculates the maximum number of messages able to be subjected to call processing per unit time from the processing capability of the subscriber terminal device 60, and further counts the number of messages subjected to the call processing. The subscriber terminal controller 64 compares the calculated maximum number of messages able to be subjected to the call processing with the counted number of messages subjected to the call processing. When the number of messages subjected to the call processing counted in the unit time exceeds the maximum number of messages able to be subjected to the call processing, at the time of exceeding the subscriber terminal controller 64 transmits a transmission regulation indicating signal via the (D+C) channel terminal section 62 to all the channels C allocated to the relevant CS concentrator. The transmission regulation indicating signal is indicative of a transmission regulating value. The CS concentrator to which the transmission regulation indicating signal is to be transmitted is a CS concentrator which receives the quantity of messages exceeding a predetermined value. The predetermined value is determined in accordance with the number of CS concentrators connected to the subscriber terminal device 60. The transmission regulating value is in proportion to a ratio at which the predetermined value is exceeded. The value higher than the ratio and closest to the regulating value of FIG. 6 is selected.

The second (D+C) channel terminal section 62 sets the transmission regulating value indicated by the subscriber terminal controller 64 on C0 and C1 bits on the channel C as shown in FIG. 6, and transmits the value as the transmission regulating information to the CS concentrator 50-1. In the CS concentrator 50-1, the CS concentrating controller 56 reads in a fixed cycle the transmission regulating information received by the first (D+C) channel terminal section 54. When the transmission regulating value is detected, in response to the subsequent calling messages a disconnection message is returned in accordance with the regulating ratio. Also, to cancel the transmission regulating value, it is indicated that there is no regulating value when the number of messages subjected to the call processing per unit time is less than the predetermined value.

Figure 7:
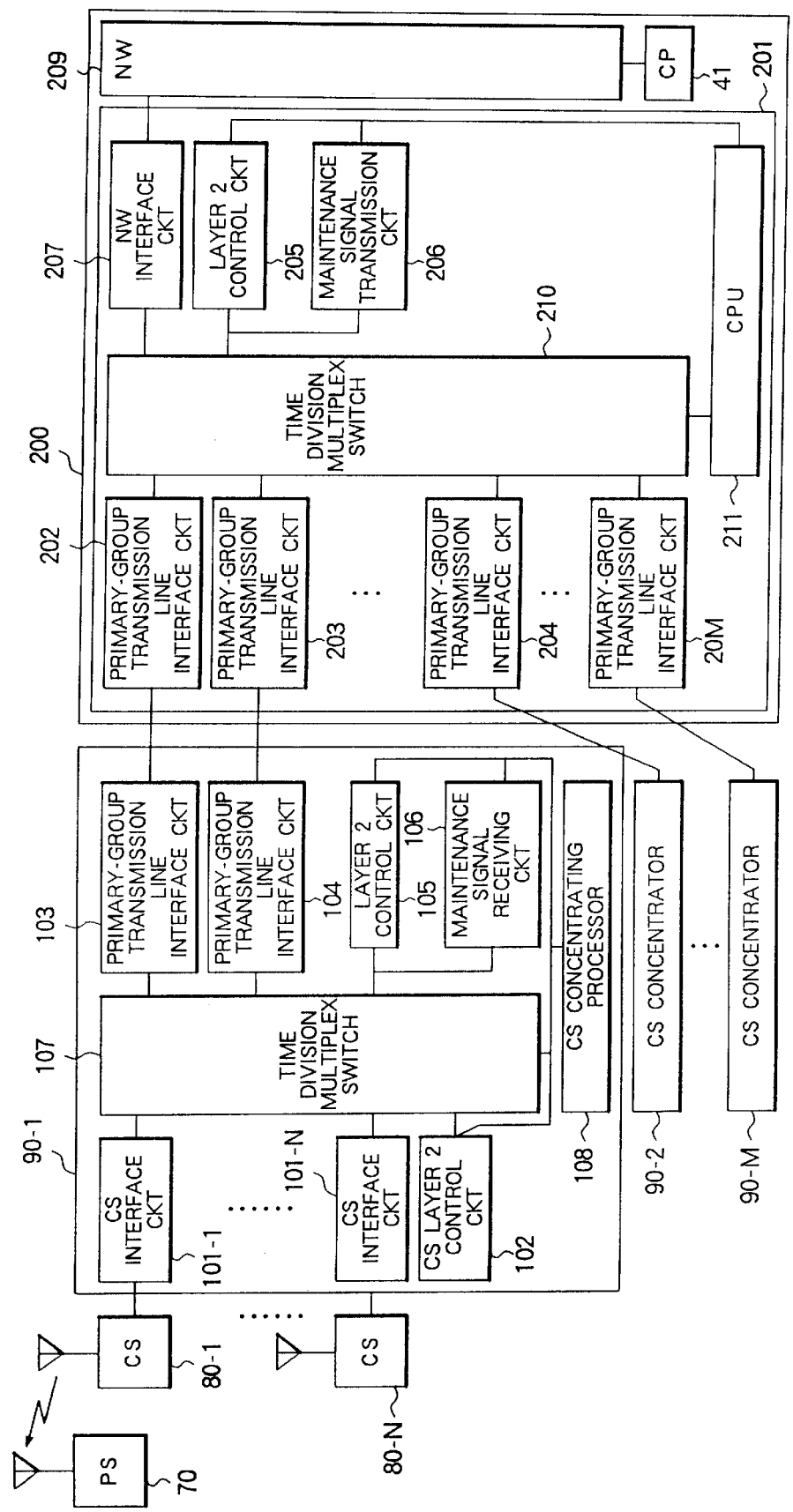
FIG. 7 is an explanatory view showing a construction of a PHS subscriber loop multiplex communication system according to a first embodiment of the present invention.
Figure 8:
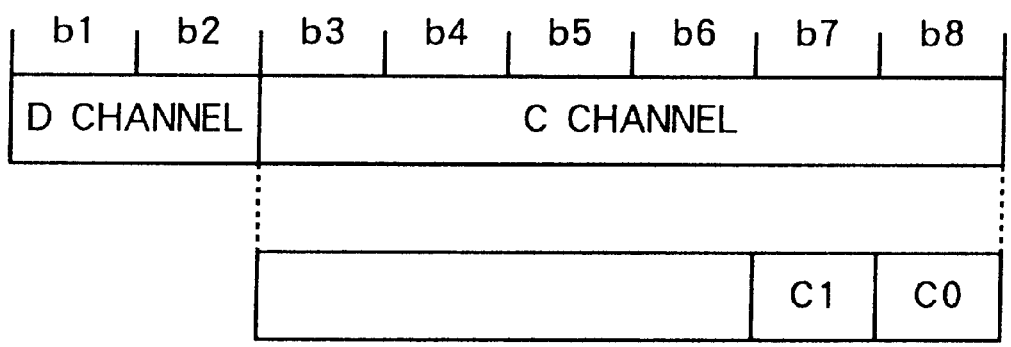
FIG. 8 is an explanatory view showing a construction of (D+C) channels between a CS concentrator and a subscriber terminal device shown in FIG. 7.

A preferred embodiment of the invention will be described with reference to FIG. 7. In FIG. 7, it is shown a plurality of CSs 80-1 to 80-N which can interface with a PHS cellular phone 70. A CS concentrator 90-1 contains a plurality of CSs 80-1 to 80-N and is located in a remote area. A construction of the CS concentrator 90-1 will be described in the following. CS interface circuits 101-1 to 101-N are connected to the CSs 80-1 to 80-N, respectively, and terminate eight lines of an interface U defined by ANSI T1. 601. A CS layer 2 control circuit 102 terminates channels D of 32 CSs, and has a TTC JT-Q921-b layer 2 control function. Primary-group transmission line interface circuits 103 and 104 have a function of interfacing with a subscriber terminal device 201 in an exchange 200 via a 2M primary-group transmission line in which two groups of (14B+D+C) channels are multiplexed as shown in FIG. 4. A layer 2 control circuit 105 controls via a channel D constituted of two bits shown in FIG. 8 a TTC JT-Q921-b layer 2 protocol which is a communication protocol between the subscriber terminal device 201 and the CS concentrator 90-1. A maintenance signal receiving circuit 106 receives from the subscriber terminal device 201 a channel C signal constituted of six bits which include two bits of transmission regulating notification shown in FIG. 8. The channel C signal is, as shown in FIG. 8, constituted of six bits including two bits of transmission regulating notification.

A time division multiplex switch 107 connects the CS interface circuits 101-1 to 101-N, the CS layer 2 control circuit 102, the primary-group transmission line interface circuits 103 and 104, the layer 2 control circuit 105 and the maintenance signal receiving circuit 106 via 2M time division multiplex interfaces, respectively. Specifically, the time division multiplex switch 107 connects the CS interface circuits 101-1 to 101-N and the CS layer 2 terminal circuit 102 for channel D communication with the CSs, connects one of the CS interface circuits 101-1 to 101-N and one of the primary-group transmission line interface circuits 103 and 104 for channel B connection between the CSs and the subscriber terminal device 201 at the time of setting calls, and connects the primary-group transmission line interface circuits 103 and 104, the layer 2 control circuit 105 and the maintenance signal receiving circuit 106 for communication between the subscriber terminal device 201 and the CS concentrator 90-1. A CS concentrating processor 108 is connected to the CS layer 2 control circuit 102, the layer 2 control circuit 105, the maintenance signal receiving circuit 106, and the time division multiplex switch 107. The CS concentrating processor 108 has functions of a TTC JT-Q931-b layer 3 protocol control, a transmission regulating control and a direction/line selecting control, and concentrates lines of PHS calls from the CSs.

The subscriber terminal device 201 includes primary-group transmission line interface circuits 202, 203, 204 to 20M which interface with the CS concentrators 90-1, 90-2 to 90-M via the 2M primary-group transmission line in which two groups of (14B+D+C) channels are multiplexed as shown in FIG. 4. A layer 2 control circuit 205 controls via the channel D constituted of two bits shown in FIG. 8 a TTC JT-Q921-b layer 2 protocol which is a protocol for communication with the CS concentrator 90-1. A maintenance signal transmission circuit 206 transmits to the CS concentrator a maintenance channel constituted of six bits which include the transmission regulating information shown in FIG. 6. An NW interface circuit 207 allows an NW 209 to interface with a time division multiplex switch 210.

The time division multiplex switch 210 connects the primary-group transmission line interface circuits 202, 203, 204 to 20M, the layer 2 control circuit 205, the maintenance signal transmission circuit 206 and the NW interface circuit 207 via time division multiplex interfaces, respectively. Specifically, by the control of a subscriber terminal processor 211, the time division multiplex switch 210 connects the primary-group transmission line interface circuits 202, 203, 204 to 20M with the layer 2 control circuit 205 and the maintenance signal transmission circuit 206 to perform a communication between each CS concentrator and the subscriber terminal device 201, and connects the first primary-group transmission line interface circuits 202, 203, 204 to 20M and the NW interface circuit 207 to perform a channel B connection between each CS concentrator and the NW 209.

The subscriber terminal processor 211 has a function of transmitting TTC JT-Q931-b layer 3 information. Also, the subscriber terminal processor 211 monitors a traffic quantity of the layer 3 information. When the monitored quantity exceeds a predetermined threshold value, the subscriber terminal processor 211 instructs the CS concentrator 90-1 to transmit the transmission regulating information.

Figure 9:
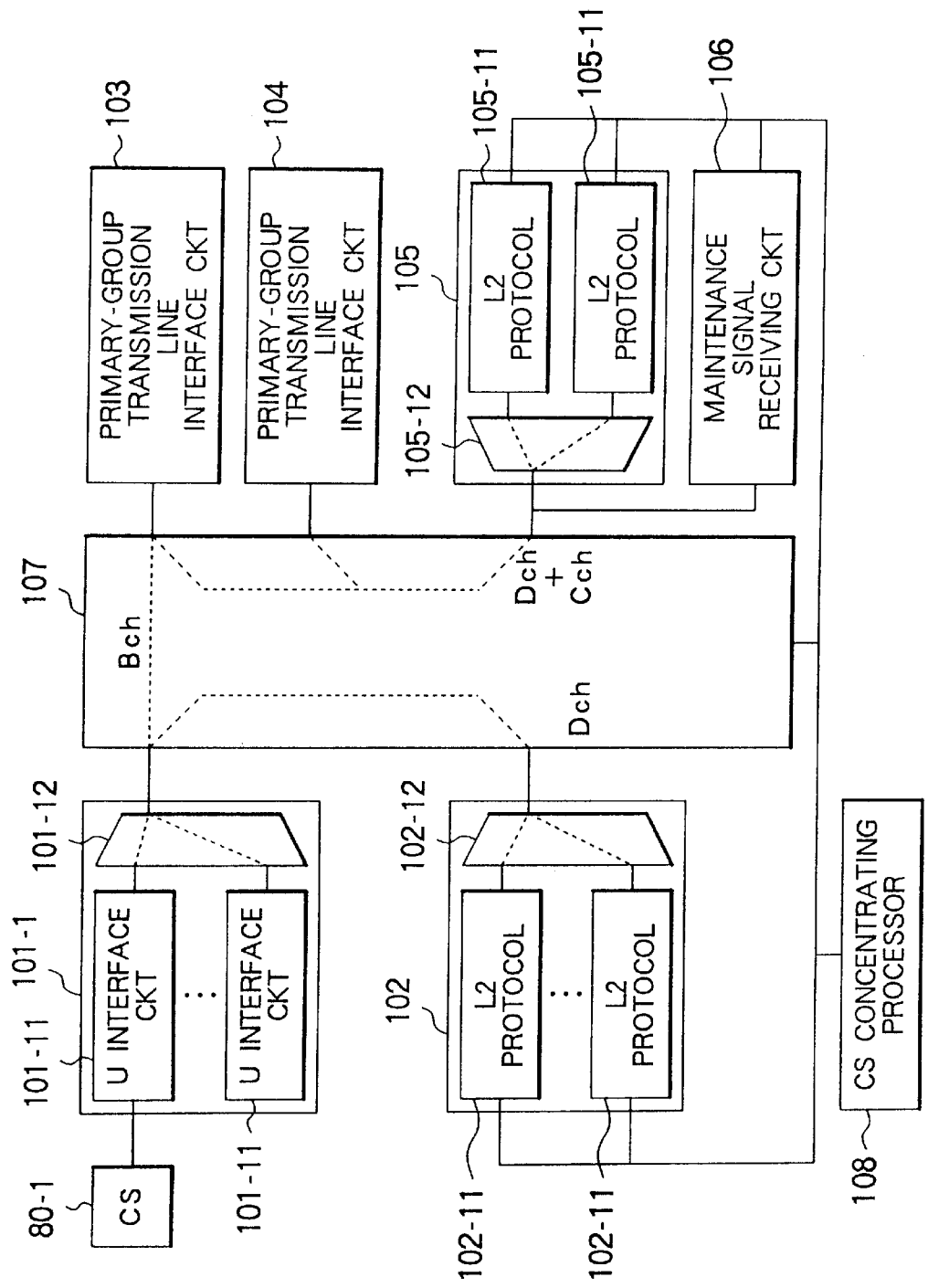
FIG. 9 is a block diagram showing a detailed construction of the CS concentrator shown in FIG. 7.

Operation of the system will be described with reference to FIG. 9. In FIG. 9, the CS interface circuit 101-1 includes a plurality of U interface circuits 101-11 and a 2M multiplex separation circuit 101-12. The CS layer 2 control circuit 102 includes a plurality of L2 protocols 102-11 and a 2M multiplex separation circuit 102-12. The layer 2 control circuit 105 includes a plurality of L2 protocols. 105-11 and a 2M multiplex separation circuit 105-12.

Figure 10:
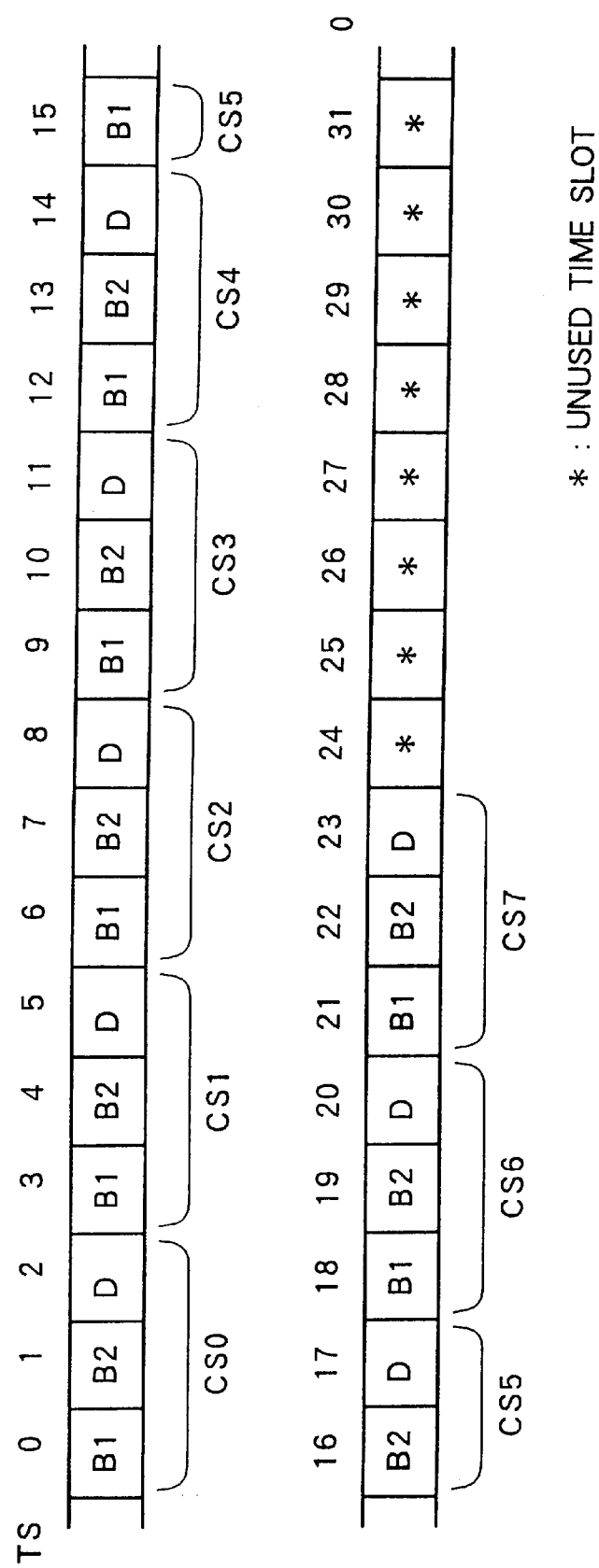
FIG. 10 is an explanatory view showing a time slot allocation between a CS interface section and a time division multiplex switch in the CS concentrator shown in FIG. 7.

As shown in FIG. 9, by the control of the CS concentrating processor 108, the time division multiplex switch 107 connects individual channel D time slots in the 2M time division multiplex interface placed in the CS interface circuit 101-1 as shown in FIG. 10 and individual channel D time slots in the 2M time division multiplex interface placed in the CS layer 2 terminal circuit 102 as shown in FIG. 11. Also, the time division multiplex switch 107 connects the (D+C) channel time slots placed as shown in FIG. 4 from the primary-group transmission line interface circuits 103 and 104 and the (D+C) channel time slots shown in FIG. 5 from the layer 2 control circuit 105 and the maintenance signal receiving circuit 106.

Specifically, time slots TS1 and TS17 of the primary-group transmission line interface circuit 103 and time slots TS1 and TS17 of the primary-group transmission line interface circuit 104 are connected to time slots TS0, TS1, TS2 and TS3 of the layer 2 control circuit 105 and the maintenance signal receiving circuit 106, respectively.

Figure 12:
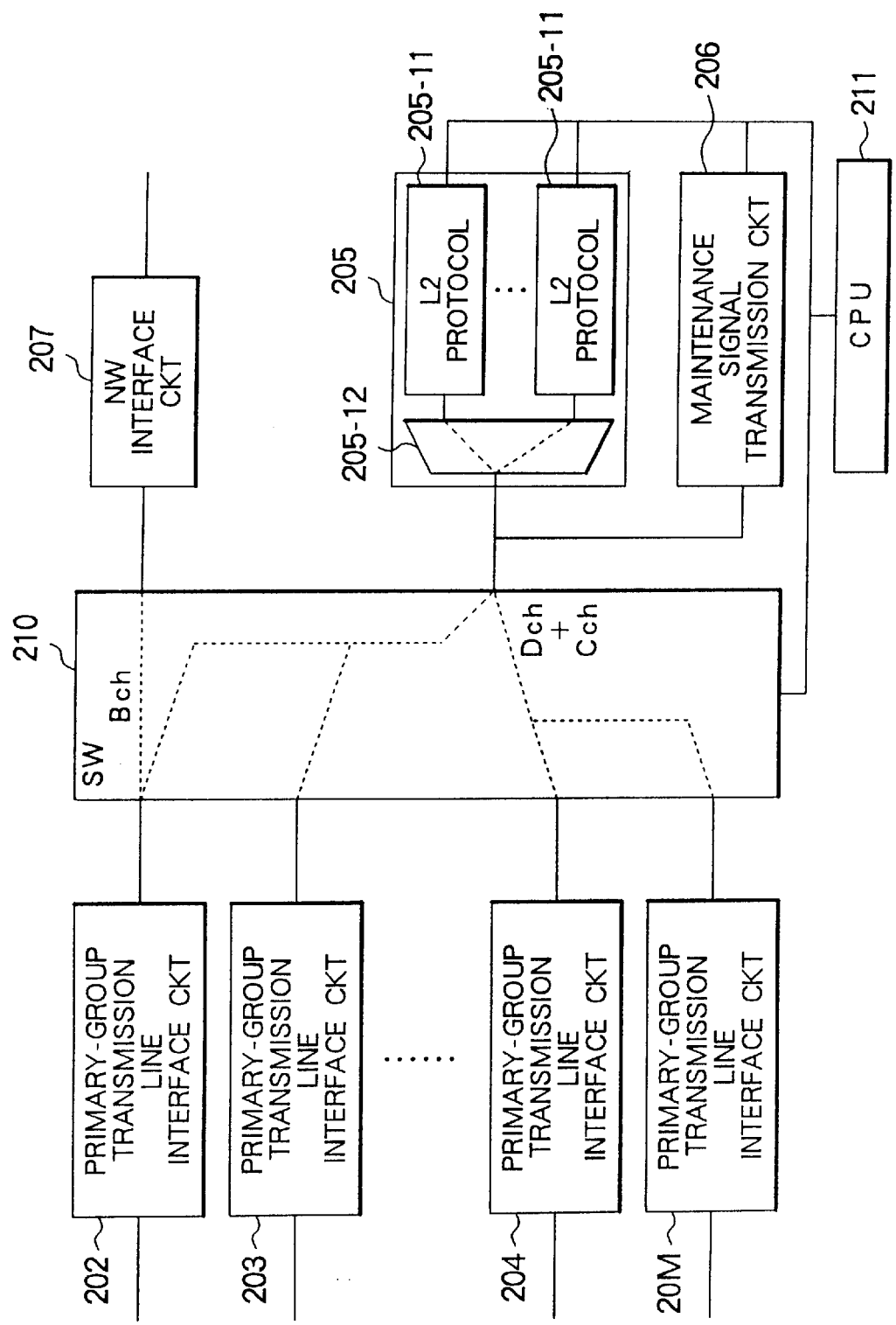
FIG. 12 is a block diagram showing a detailed construction of the subscriber terminal device shown in FIG. 7.
Figure 13:
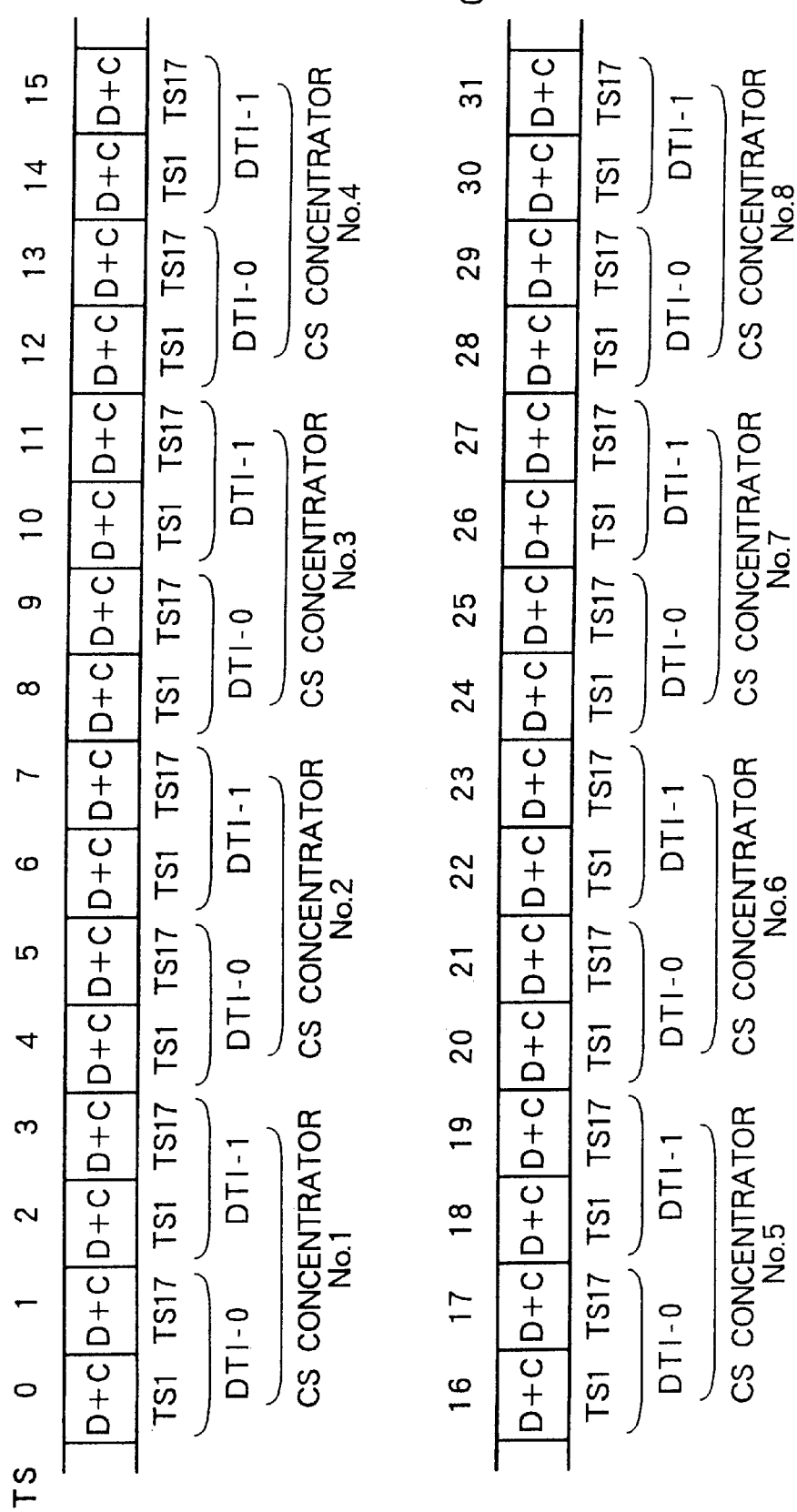
FIG. 13 is an explanatory view showing a time slot allocation between a (D+C) terminal section and a time division multiplex switch in the subscriber terminal device shown in FIG. 7.

As shown in FIG. 12, the layer 2 control circuit 205 in the subscriber terminal device 201 includes a plurality of L2 protocols 205-11 and a 2M multiplex separation circuit 205-12. By the control of the subscriber terminal processor 211, the time division multiplex switch 210 in the subscriber terminal device 201 connects the (D+C) channel time slots placed as shown in FIG. 4 from the primary-group transmission line interface circuits 202, 203, 204 to 20M and (D+C) channel time slots shown in FIG. 13 from the layer 2 control circuit 205 and the maintenance signal receiving circuit 206. The time division multiplex switch 210 also connects the channel B time slots placed as shown in FIG. 4 from the primary-group transmission line interface circuits 202, 203, 204 to 20M and channel B time slots of the NW interface circuit 207 which interfaces with the NW 209 in the exchange 200.

The CS concentrating processor 108 selects a group with a vacancy in channel B on reception of a calling information from a PS 70 to be connected to the CS interface circuit 101-1, and transmits the calling information with the designated number of the vacant channel B to the subscriber terminal device 201 in the exchange 200 via the layer 2 control circuit 105 for terminating the channel D of the selected group. Additionally, the CS concentrating processor 108 controls the time division multiplex switch 107 to connect a channel B time slot of the CS interface circuit 101-1 designated by the calling CS and a vacant channel B time slot of the first primary-group transmission line interface circuit 103. Additionally, at the time of disconnection, the connection of the time division multiplex switch 107 between the CS interface circuit 101-1 and the primary-group transmission line interface circuit 103 is released.

Subsequently, the subscriber terminal processor 211 calculates the maximum number of messages able to be subjected to call processing per unit time, e.g., two seconds from the processing capability of the subscriber terminal device 201, and further counts the number of messages subjected to the call processing. The subscriber terminal processor 211 compares the calculated maximum number of messages able to be subjected to the call processing with the counted number of messages subjected to the call processing. When the number of messages subjected to the call processing counted in the unit time exceeds the maximum number of messages able to be subjected to the call processing, at the time of exceeding the subscriber terminal processor 211 transmits a transmission regulation indicating signal via the maintenance signal transmission circuit 206 to all the channels C allocated to the relevant CS concentrator. The transmission regulation indicating signal is indicative of a transmission regulating value. The CS concentrator to which the transmission regulation indicating signal is to be transmitted is a CS concentrator which receives the quantity of messages exceeding a predetermined value. The predetermined value is determined in accordance with the number of CS concentrators connected to the subscriber terminal device 201. For example, the predetermined value is equal to a quotient wherein the maximum number of messages able to be subjected to the call processing is divided by the number of CS concentrators. The transmission regulating value is in proportion to a ratio at which the predetermined value is exceeded. The value higher than the ratio and closest to the regulating value of FIG. 6 is selected. For example, based on a value calculated in (B/A)×100(%) in which A denotes the number of received messages and B denotes the predetermined value, the regulating value shown in FIG. 6 higher than the calculated value is selected and transmitted.

Figure 14:
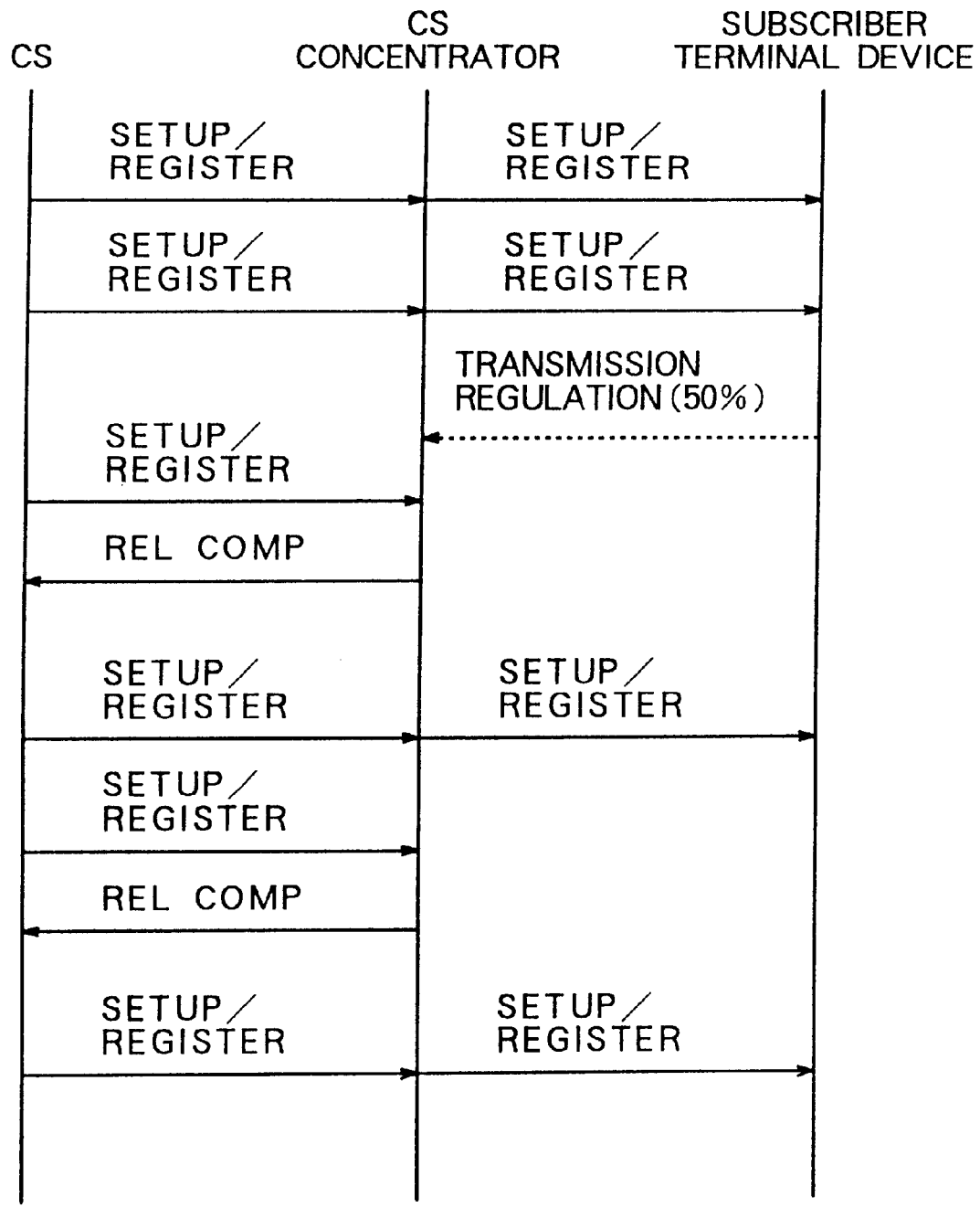
FIG. 14 is an explanatory view of returning of a disconnection message.

The maintenance signal transmission circuit 206 sets the regulating value indicated by the subscriber terminal processor 211 on C0 and C1 bits on the channel C as shown in FIG. 6, and transmits the value to the relevant CS concentrator. In the CS concentrator, the CS concentrating processor 108 reads in a fixed cycle, e.g., 100 ms the transmission regulating information on either channel C received by the maintenance signal receiving circuit 106. In the CS concentrator which comes under the above, when the transmission regulating value is detected from the transmission regulating information, in response to the subsequent calling/position registration messages a disconnection message is returned in accordance with the regulating ratio as shown in FIG. 14. For example, in the case of 50% regulation, the disconnection message is transmitted in response to every other calling message. Also, to cancel the transmission regulating value, it is indicated that there is no regulating value when the number of messages in the unit time, e.g., two seconds is less than the predetermined value.

Figure 15:
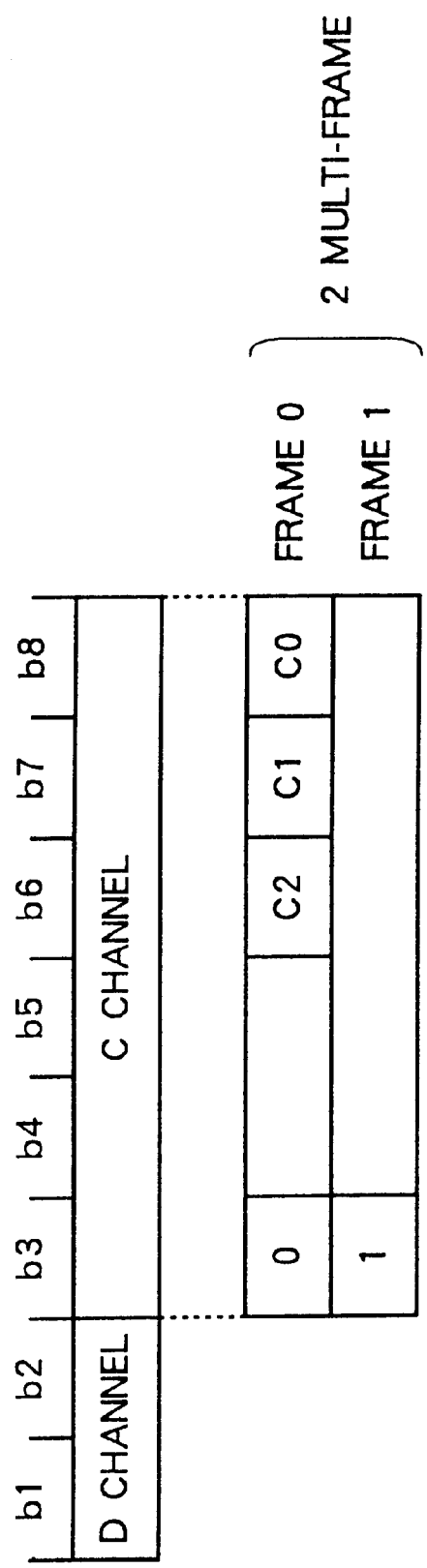
FIG. 15 is a channel C construction diagram showing a modification of the invention.

Additionally, the group of (14B+D+C) channels can be applied as a group of (nB+D+C) to not only the 2M primary-group transmission line but also the 1.5M primary-group transmission line and further to an n-group transmission line. Also, for the constitution of the channel C, in order to increase transmission regulating stages, the six-bit constitution may be expanded to provide an n-frame or multi-frame constitution for other control information such as loop-back test information, S/T point control information and the like. FIG. 15 illustrates two multi-frames.

According to the invention, a PHS system using the simpler and more efficient 2M primary-group transmission line can be constructed as compared with the conventional PHS system of the (16B+D) channel constitution using the conventional 1.5M primary-group transmission line. Specifically, without changing the interface structure (16B+D) for sharing the channel D which has been used in the conventional PHS system, the channels B, D and C in the 2M primary-group transmission line interface are placed in such a manner that the number of unused time slots is reduced.

Also, according to the invention, even when an excess load is generated for the PHS system, the predetermined call processing capability can be realized. Specifically, by using the channel other than the call control information channel in which a processing delay arises dependent on the quantity of information or by using the maintenance control information channel which is not dependent on the quantity of information, the quantity of input calls can be quickly suppressed on the side of the CS concentrator.

What is claimed is:

1. A PHS subscriber loop multiplex communication system wherein connection is made by a 2M primary-group transmission line between a PHS radio base station concentrator connected to a PHS radio base station and located in a remote area and a subscriber terminal device in a PHS exchange, and two (14B+D +C) channel call control groups are multiplexed on the 2M primary-group transmission line, wherein said subscriber terminal device includes means for monitoring a traffic quantity on a channel D of said PHS radio base station concentrator and determining a traffic regulating value and means for using a channel C for maintenance control information to transmit the determined traffic regulating value to said PHS radio station concentrator, and wherein said PHS radio base station includes means for receiving the traffic regulating value from said subscriber terminal device and means for transmitting a disconnection message in response to a calling/position registration signal from said PHS radio base station in accordance with the received traffic regulating value.

2. A PHS subscriber loop multiplex communication system which includes a PHS radio base station concentrator connected to a PHS radio base station and located in a remote area and a PHS exchange including a subscriber terminal device, wherein said PHS radio base station concentrator includes first interface means for interfacing with said subscriber terminal device via a 2M primary-group transmission line in which two (14B+D+C) channel call control groups are multiplexed on a single transmission line; first (D+C) channel terminal means for terminating a channel D for performing communication with said subscriber terminal device by using TTC JT-Q921-b and a channel C for receiving maintenance control information from said subscriber terminal device; and first switch means for using a time division switch to connect (D+C) channel information of said first (D+C) channel terminal means to a (D+C) channel interfacing on said 2M primary-group transmission line, said subscriber terminal device including second interface means for interfacing with said PHS radio base station terminal device via the 2M primary-group transmission line in which two (14B+D+C) channel call control groups are multiplexed on a single transmission line; second (D+C) channel terminal means for terminating the channel D for performing communication with said PHS radio base station by using TTC JT-Q921-b and the channel C for transmitting the maintenance control information to said PHS radio base station concentrator; and second switch means for using a time division switch to connect the (D+C) channel information of said second (D+C) channel terminal means to the (D+C) channel interfacing on said 2M primary-group transmission line, and in said 2M primary-group transmission line, two groups of (14B+D+C) channels being placed.

3. A PHS subscriber loop multiplex communication system as claimed in to claim 2 wherein said subscriber terminal device further includes regulation indicating means for monitoring a traffic quantity on the channel D of said PHS radio base station concentrator and indicating to said PHS radio base station concentrator a traffic regulating value in accordance with a congestion degree when detecting a traffic congestion beyond the processing capability of said subscriber terminal device; and means for transmitting said traffic regulating value via the channel C to said PHS radio base station concentrator, said PHS radio base station concentrator further including means for receiving said traffic regulating value from said maintenance control information from said subscriber terminal device and means for transmitting a disconnection message in response to a new calling or position registration message received from said PHS radio base station in accordance with the received traffic regulating value, and when said subscriber terminal device is in a congested condition, by using maintenance control information transmission means other than call controlling transmission means, transmission regulation being indicated to said PHS radio base station concentrator.

* * * * *